US005734804A

United States Patent [19]

Bergner

[11] Patent Number: 5,734,804

[45] Date of Patent: Mar. 31, 1998

[54] METHOD FOR DISPLAYING MACHINE MALFUNCTIONS

[75] Inventor: Wolfgang Wilhelm Karl Bergner, Waldbüttelbrunn, Germany

[73] Assignee: Koenig & Bauer Aktiengesellschaft, Wurzburg, Germany

[21] Appl. No.: 670,222

[22] Filed: Jun. 20, 1996

Related U.S. Application Data

[63] Continuation of Ser. No. 111,859, Aug. 26, 1993.

[30] Foreign Application Priority Data

Aug. 26, 1992 [DE] Germany ........................ 42 28 281.0

[51] Int. Cl.[6] ........................ G06K 15/00

[52] U.S. Cl. ........................ 395/113; 395/101

[58] Field of Search ........................ 395/113, 183.22, 395/185.01, 185.1, 101, 112, 114–115, 117; 358/404, 406, 437; 355/206, 205, 203, 204, 207, 208, 209; 399/8, 9, 10, 11, 12, 13, 15, 18–21; 348/88, 125, 154, 153, 155; 364/188, 146; 340/825.06, 825.15, 825.16, 825.17, 525; 382/112

[56] References Cited

U.S. PATENT DOCUMENTS

| | | | |
|---|---|---|---|
| 4,062,061 | 12/1977 | Batchelor | 395/184.01 |
| 4,503,407 | 3/1985 | Ogura | 355/206 |
| 4,583,834 | 4/1986 | Seko et al. | 355/206 |
| 4,586,034 | 4/1986 | Nakamine | 340/679 |
| 4,639,881 | 1/1987 | Zingher | 395/161 |
| 4,853,946 | 8/1989 | Elliott et al. | 378/4 |
| 5,023,817 | 6/1991 | Au | 364/550 |
| 5,103,498 | 4/1992 | Lanier et al. | 395/68 |
| 5,121,113 | 6/1992 | Kedge et al. | 345/168 |
| 5,138,400 | 8/1992 | Kurosawa | 355/56 |
| 5,363,204 | 11/1994 | Millman | 358/406 |
| 5,377,319 | 12/1994 | Kitahara et al. | 395/161 |

FOREIGN PATENT DOCUMENTS 3608219 11/1986 Germany .

OTHER PUBLICATIONS

Patent Abstracts of Japan; JP-A-01 317059; Mar. 6, 1990; vol. 14; No. 120; Patent Date: Dec. 21, 1989.
Microsoft Press Computer Dictionary; 1994; Second Edition pp. 206–207 and 410.

*Primary Examiner*—Edward L. Coles, Sr.
*Assistant Examiner*—Dov Popovici
*Attorney, Agent, or Firm*—Jones, Tullar & Cooper, P.C.

[57] ABSTRACT

A method for displaying machine malfunctions, particularly for polygraphic machines such as large printing presses, provides concrete instructions for quickly finding and eliminating these machine malfunctions without it being necessary to consult a machine handbook. With the occurrence of a malfunction, an actual image or a series of actual images of the machine is/are displayed on a monitor of a machine control console for effective guidance to the source of the malfunction. Instructions for eliminating the respective malfunction are also displayed.

4 Claims, 1 Drawing Sheet

METHOD FOR DISPLAYING MACHINE MALFUNCTIONS

This application is a continuation of application Ser. No. 08/111,859, filed Aug. 26, 1993.

FIELD OF THE INVENTION

The present invention relates to a method for displaying machine malfunctions, particularly for polygraph machines such as large printing presses.

BACKGROUND OF THE INVENTION

A generic device for displaying, registering and evaluating causes for the stoppage of polygraphic machines, such as large printing presses, is disclosed in German Patent Disclosure DE 36 08 219 A1, in which sensors that are connected to display elements in a console are disposed at possible points of malfunction, and give off visual signals when deviations from a nominal value occur. When this happens, the points of malfunction are marked with characterizing symbols.

The disadvantage of this development is that, because of the symbols, a machine handbook must be consulted to learn the possible steps for precisely identifying and eliminating the malfunction. This is not only more time-consuming, thus resulting in losses in productivity, but the operating and malfunction-tracing instructions must be translated into the respective language of the country in which the machine is used.

OBJECT AND SUMMARY OF THE INVENTION

The object of the invention is to create a method for displaying machine malfunctions that provides concrete instructions for quickly finding and eliminating these machine malfunctions without necessitating the consultation of a machine handbook.

This and other objects of the invention are attained by providing a method for displaying machine malfunctions in which actual images of the malfunctioning machine are displayed on a monitor so that an operator can quickly find and eliminate the machine malfunctions. To achieve this result, a program in a stored-program control mechanism receives input signals from a plurality of malfunction-indicating devices, such as sensors, limit switches, thermal relays or the like, which are connected to various elements of the machine to be monitored. In response to these signals, the program generates malfunction numbers or codes, which are then fed into a computer that uses them to access stored images which correspond to the malfunction numbers. These are actual images of the machine that provide visual illustrations of the malfunctions, and are displayed on a computer monitor screen.

The following advantages in particular result from the use of the invention. Through the representation of actual images on the computer screen, the operator can be guided immediately to sources of malfunctions and can promptly work on eliminating them without having to read a machine handbook. Because of this, translation efforts can be omitted if the machines are used abroad. The identification and elimination of malfunctions can therefore also be undertaken by support personnel.

The invention will be explained below by way of an exemplary embodiment in conjunction with the accompanying drawings.

DETAILED DESCRIPTION OF THE PREFERRED EMBODIMENT

Figure 1:
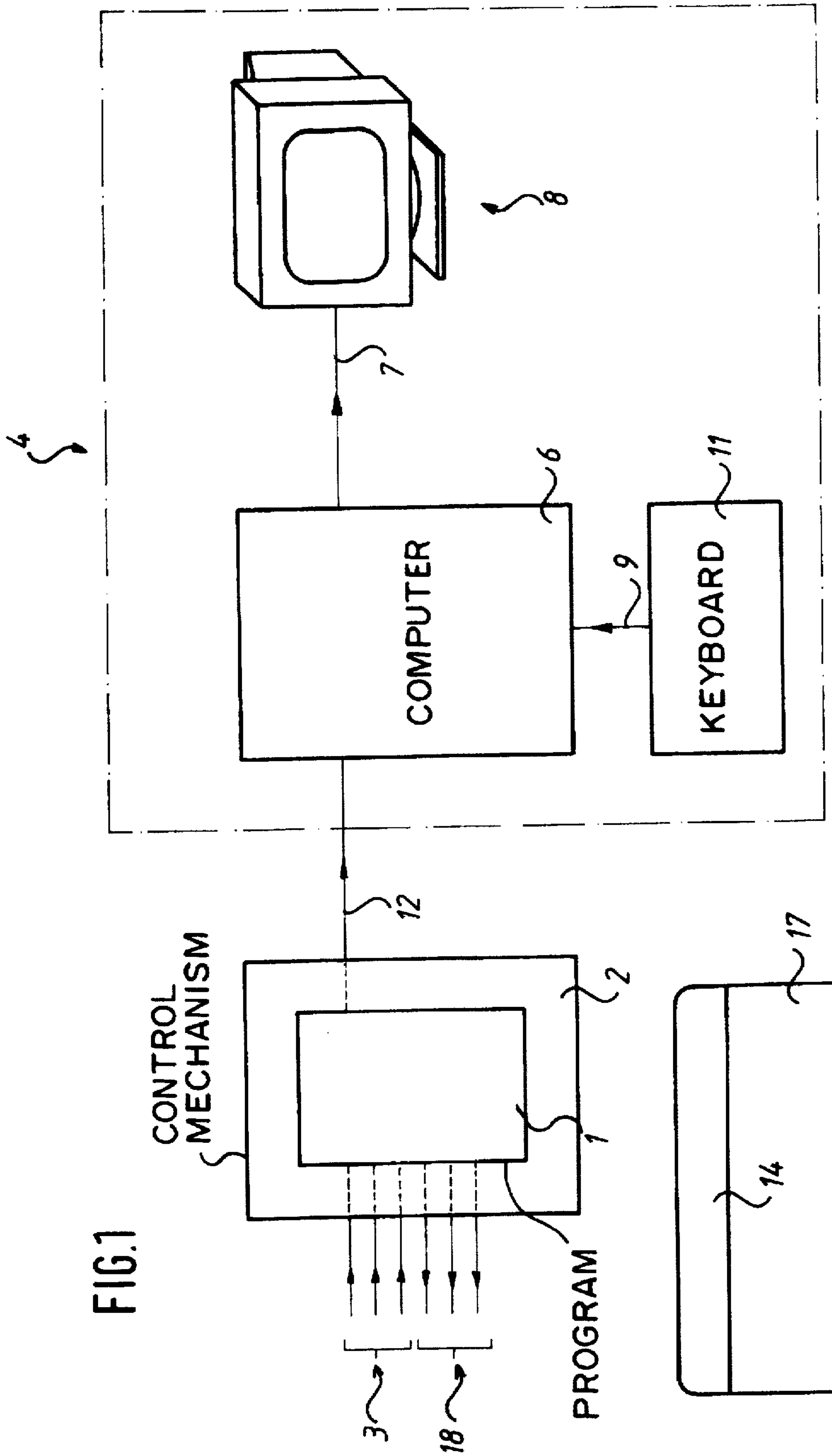
FIG. 1 is a schematic representation of a device for executing the method.

Turning now to a detailed consideration of a preferred embodiment of the present invention, FIG. 1 illustrates a program 1 of a known stored-program control mechanism 2 which is connected via lines to one or more malfunction-indicating devices in a machine to be monitored, such as a large printing press (not shown). The malfunction-indicating devices can comprise sensors, limit switches, thermal relays or the like. The malfunction-indicating devices are connected to bearings, drive motors, protective devices and the like in the machine. A control console, indicated in its entirety by 4, comprises a personal computer 6, which is connected to a monitor 8 via a monitor cable 7 and to an entry keyboard 11 via a cable 9. The personal computer 6 is further connected to the program 1 of the stored-program control mechanism 2 via a conventional ARCNET communication interface 12.

Figure 2:
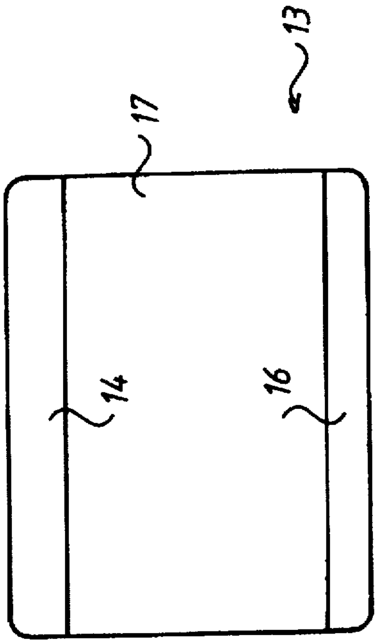
FIG. 2 is an enlarged representation of a monitor.

An enlarged representation of a display screen 13 of the monitor 8 is shown in FIG. 2, wherein production data is displayed in an upper region 14, information is displayed in a lower region 16, and communications are displayed in a central region 17. The stored-program control mechanism 2 can be disposed in a sheet metal housing on the machine, independently of the control console 4.

If a malfunction occurs, which can be the emergency shutdown of the machine, for example, program 1 of the stored-program control mechanism 2 receives a signal via the sensors disposed on a limit switch connected to the machine and via the input 3, and assigns a corresponding number to the malfunction, such as 0101, for example. Using the malfunction number, the personal computer then searches for an associated actual image and displays it in the central region 17 of the monitor 8. In the case of an emergency shutdown of the machine, the displayed image is that of the main machine switch which indicates to an operator that the machine has shut down. The operator can now immediately find and operate the main machine switch displayed in the central region 17 after elimination or cessation of the malfunction, thus putting the machine back into operation. Then, the image of the main machine switch disappears from the central region 17 of the screen 13.

As another example, should a protective device of a sheet feeder of a printing press be open, signals are sent from the printing press via the input 3 into the stored-memory control mechanism 2. The program 1 of the stored-memory control mechanism 2 uses these inputs to generate a malfunction number, such as 0191, and feeds this number into the personal computer 6 which displays an actual image of an open protective device in the central region 17 of the monitor 8. Once the malfunction is eliminated and the protective device is reclosed by the operator, the printing press can now start up again.

It is also possible to display a series of actual images in order to localize and eliminate a malfunction. For example, when a malfunction occurs in the ink ductor roller in the printing group 2, which is assigned malfunction number 0221, a series of actual images can be displayed that will guide the operator to the source of the malfunction. These images can be in the following sequence:

1. A side view of the machine with the indication of the printing group 2, in the form of an arrow or a frame, for example;

2. An image of the printing group 2 in the open state, with a view of the rollers and identification of an applicator roller by means of an indicating arrow, for example; and 3. A view of the applicator roller with an indication of the change in position of the applicator roller in relation to the plate cylinder. This can also be effected by the display of two images next to each other in the central region 17 of the monitor 8, on which both the actual position and the required position of the applicator roller with respect to the plate cylinder are shown.

The image sequence can be called up via a key of the entry keyboard 11. Moreover, commands from the control console 4 to the machine can also be issued by means of the entry keyboard 11, via outputs 18 of the program 1.

It is also possible, in addition to the display of the malfunction occurrence on the monitor 8, to transmit an acoustic signal, e.g. by means of an electronic horn, to alert the operator to the occurrence of a malfunction. This applies particularly to malfunctions that do not result in an immediate shutdown of the machine, such as margin errors or full sheet errors.

The production of actual images can be effected by means of a video camera and an accessory, such as a plug-in card known as a video digitizer, into the personal computer 6. By means of an arrangement of this type, a video image is digitized and stored, and can be called up if needed, as described above.

Although the invention has been disclosed in terms of a preferred embodiment, it will be understood that numerous other variations and modifications could be made thereto without departing from the scope of the invention as set forth in the following claims.

What is claimed is:

1. A method for displaying malfunctions of a large printing press, which employs visual and acoustic indications of malfunctions, said method comprising the steps of:

a) supplying at least one signal indicative of a printing press malfunction from at least one malfunction indicator to a program in a stored-program control mechanism;

b) generating a malfunction number in response to said at least one signal, said malfunction number corresponding to the malfunction indicated by said at least one malfunction indicator;

c) feeding said malfunction number to a computer, said computer including a video storage medium and a computer monitor screen;

d) accessing at least one of a plurality of video images stored in said video storage medium, said accessed stored video images being allocated to said malfunction number, each of said stored video images being an actual video image of an element of the printing press to be monitored, each such actual stored video image showing a location on the printing press of the printing press malfunction; and e) displaying said at least one of said plurality of actual stored video images of said element of the printing press on said computer monitor screen for use in guiding an operator directly to the location of the malfunction and for use in guiding an operator in eliminating the respective malfunction.

2. The method of claim 1, wherein the step of generating a malfunction number further comprises feeding at least one signal from said at least one malfunction indicator into a stored-program control mechanism and employing a program in said stored-program control mechanism to generate said malfunction number from said at least one signal.

3. The method of claim 1 further including displaying a series of said plurality of said stored video images in a sequence and using said series of displayed video images for guiding an operator in localizing and eliminating the malfunction in the printing press.

4. The method of claim 1 further including providing each of said plurality of stored video images of an actual element of the printing press by means of a video camera and a video digitizer, said video digitizer digitizing video images produced by said video camera and storing said video images in memory.

* * * * *